… …

United States Patent Office 3,148,167
Patented Sept. 8, 1964

---

3,148,167
POLYURETHANE COMPOSITION CONTAINING AN EPOXY COMPOUND
Orin C. Keplinger, Jr., Cuyahoga Falls, Ohio, assignor to The General Tire & Rubber Company, Akron, Ohio, a corporation of Ohio
No Drawing. Filed Nov. 14, 1958, Ser. No. 773,812
17 Claims. (Cl. 260—40)

The present invention relates to polyurethane compositions having improved aging resistance at high temperatures and to a method of preparing the same.

Substantially linear long chain non porous type polyurethanes and particularly polyester-urethanes have great commercial possibilities for use in tires, belting, gaskets and the like because of their exceptional properties such as high tensile strength, high abrasion resistance, high flex life and high resistance to tearing. However, the rubbery polyurethanes and particularly the polyester urethanes such as poly(ethylenebutylene) adipate/diisocyanate polyurethanes have been degraded severely by aging in absence of oxygen, for example in hot oil or in a form having a thick cross section say at temperatures of 250 to 300° F. The softening and depolymerization of such polyurethane rubbers when exposed to heat during their service has seriously limited their use.

It is an object of the present invention to provide a polyurethane elastomer composition that has good hot oil aging properties.

It is an object to provide a method of making a polyurethane rubber composition that can maintain a high order of physical properties for a long period of heat aging.

I have found that the resistance of polyurethane elastomers to degradation and depolymerization upon exposure to heat in a non-oxidizing environment is greatly increased by compounding the polyurethane elastomer with an organic epoxide. The epoxide preferably has a linear chain of about 10 to 20 carbon atoms although chains having up to as high as 40 to 45 carbon atoms and as low as 3 carbon atoms can be used. The epoxide also preferably has at least two epoxy groups preferably terminal epoxy groups to react with the polyurethane chain at elevated temperature.

While I do not wish to be held to the following theory, the reason that the epoxy compound (which is preferably a monomeric diepoxide compound) permits the polyurethane elastomer to maintain a high level of properties at high temperatures might be that there is a crosslinking action which is enough to offset the apparent breakdown of the polyurethane chains themselves. While eventually the elastomer may soften and depolymerize in some cases apparently due to a complete breakdown of the molecular chains of the polyurethane, nevertheless the action of the diepoxide compound helps to maintain a high level of physical properties in the polyurethane elastomer for a relatively long period of time.

The preferred diepoxide compound is the diglycidyl ether of bisphenol A, the formula for which is set forth as follows:

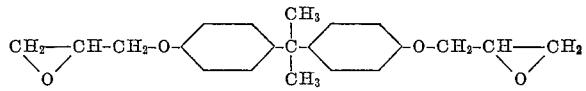

Other suitable diepoxide compounds having 10 to 20 carbon atoms are those formed by the reaction of an aliphatic organic compound having an ethylene oxide unit on at least one of its chain ends such as epichlorohydrin (1-chloro-2,3-epoxy propane) and an organic polyhydric alcohol having 2 to 3 hydroxyl groups and preferably having 3 to 17 carbon atoms such as bisphenol A (2,2- p-hydroxy phenyl propane), bisphenol C [2,2-bis(4-hydroxy-5-methyl phenyl) propane], glycerol and ethylene glycol.

While mixtures of monomeric and polymeric products of the above epoxy and alcoholic compounds may be used to provide benefits of the present invention, a monomeric material such as the diglycidyl ether of bisphenol C is preferably used alone although mixtures can be used in which the monomeric diepoxide compound forms at least 60 percent by weight of the mixture and preferably 75 percent by weight for the best results when using a mixture. Thus, for best results the polymerized material having molecular weights say of 350 to 700 or more, when used at all, should comprise only up to about 15 or 20 percent by weight of the mixture. However, substantial benefits of the present invention can be obtained by using diepoxide terminated polymers of relatively low molecular weight say of 350 to 1000 such as Epon 828 which is a polymer of epichlorohydrin and bisphenol A having a molecular weight of about 384. Bisphenol A is a commercial organic alcohol which may be identified as bis(4-hydroxyphenyl) dimethyl methane.

Suitable epoxy containing organic compounds in accordance with the present invention are organic compounds having 2 functional epoxy groups such as a cyclo hexane diepoxide material (EP 201); neo pentyl diepoxide which is formed by reacting epichlorohydrin with neo pentyl glycol; the diepoxide formed by reacting pentylene-1,5-glycol with epichlorohydrin, Epon 828 which is a diepoxide terminated polymer of epichlorohydrin and bisphenol A having a molecular weight of about 384 as previously discussed; and the diglycidyl ether of tetra bromo-bisphenol A and epichlorohydrin. Substantial improvement in heat aging is also obtained by incorporating into the polyurethane elastomer epoxy containing compounds that have only one functional epoxy group and including no group reactive with polyols or polyisocyanate such as hydroxyl or amine groups. These include phenyl glycidyl ether, styrene oxide and a reaction product of Cardanol and epichlorohydrin. Cardanol is stated to be the monophenolic component of commercial cashew nut shell oil. Thus Cardanol has a formula as follows:

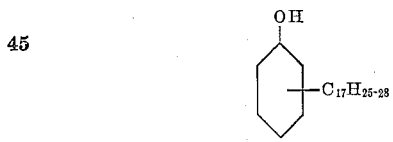

There is some unsaturation in the aliphatic side chain. Other aliphatic chain substituted phenols can also be used in place of Cardanol in which the aliphatic side chain has 10 to 20 carbon atoms.

One of the previously described stabilizing epoxide compounds is EP 201, sold by Union Carbide. This diepoxide has the formula:

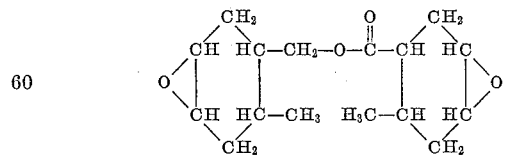

I have also found that generally the best hot oil resistance and the longest lasting resistance is provided by using a diepoxide compound as a starting ingredient for the preparation of the polyurethane itself. While there is no apparent visible physical difference in the polyurethane gum prepared by including a small amount of diepoxide, preferably 5 to 15 or more parts of diepoxide per 100 parts of diisocyanate plus polyol, nevertheless such polymers have excellent heat or hot oil resistance for extended periods of time. Thus, hot oil resistance can be provided when using an organic compound having preferably at least 2 epoxy groups either by incorporating the diepoxide in the original polyurethane or by addition of a mono or diepoxide to the unmodified gum at the compounding stage or by incorporating epoxide compounds both ways. In any event, generally the amounts of epoxy compound used are .25 to 20 parts.

While curing by peroxides generally provides the best all around properties in the resultant polyurethane composition, I have found that curing by excess polyisocyanate and using a diepoxide compound additive sometimes provides the composition with such oil resistance that the rubber composition has exhibited no change in modulus even after being aged in 300° F. oil for 100 hours. It is also possible to substitute phenol formaldehyde resins or methylol ureas for the polyisocyanate with good results.

I have also found that, although acid anhydrides such as maleic anhydride when used alone impart little or no oil resistance to polyurethanes, the combination of acid anhydride plus epoxy compound provides improved hot oil resistance to the polymers, the two ingredients providing apparently a synergistic effect on the property of hot oil resistance.

In accordance with the present invention anhydrides of organic dicarboxylic acids such as phthallic acid anhydride and maleic acid anhydride may be used to provide excellent resistance to thermal degradation of polyurethane polymers in the absence of oxygen in amounts of .5 to 10 parts by weight and preferably 1 to 5 parts by weight based on 100 parts of the polyurethane elastomer.

In accordance with the present invention, the best hot oil aging resistance is obtained using about 5 to 15 parts by weight of the epoxy compound (preferably the diepoxide compound) per 100 parts polyurethane elastomer although amounts as low as .25 or .5 part by weight impart some resistance to hot oil to resultant polyurethane compositions. While as much as 20 parts or more of diepoxide can be used, generally the use of more than 10 parts does not impart any additional benefits to the polyurethane composition and thus the use of more than 10 parts is generally uneconomical.

The polyurethane elastomers used in accordance with the present invention are polyol/polyisocyanate polymers in which the polyol is an active hydrogen containing compound having at least 2 active hydrogens such as a hydroxy terminated polyether or polyester having a molecular weight of at least 500. The preparation of suitable polyester urethane and polyether urethane elastomers are described in U.S. Patent Nos. 2,620,516; 2,625,531; 2,625,635; 2,692,873; and 2,692,874. Suitable polyurethanes may also be prepared as described in U.S. application No. 535,280 of Gruber and Keplinger, filed Sept. 10, 1955, in which suitable rubbery reaction products of an organic diisocyanate with a dihydroxy polyester such as poly(ethylene propylene) adipate or a dihydroxy polyether such as polytetramethylene ether glycol are described. As also described therein, the polyester and/or polyether material should have a molecular weight of at least 500 and preferably 1000 to obtain rubbery products, although for the best all around physical properties the molecular weight should be 1500 to 3000. Polyols with molecular weights as high as 4000 are also suitable, although the expense of making polyols over 4000 to 5000 usually restricts their use.

As used herein, the term polyol indicates a substantially linear long chain active hydrogen containing compound having a molecular weight of generally about at least 500 and terminated with hydroxyl groups containing active hydrogen atoms. Examples of polyols are hydroxy terminated polyesters and polyethers such as poly(ethylene-propylene) adipate and polytetramethylene ether glycol. The molecular chain of the polyol extending between terminal hydroxyl groups preferably contains only carbon, hydrogen and oxygen atoms. The chain itself has only carbon to carbon or carbon to oxygen linkages. While some unsaturation or double bonds may be present, the carbon to carbon linkages are preferably of the aliphatically saturated type.

The molecular chains of the polyethers are preferably of the linear long-chain type in which the chains are built of aliphatic groups. At least 50% of the polyether chain linkages are preferably aliphatic carbon to carbon links in contrast to cyclic units such as found in cellulose and starch.

Suitable diisocyanates are any aromatic and/or aliphatic diisocyanates such as p,p′-diisocyanato diphenyl methane, 2,4-tolylene diisocyanate, naphthalene-1,5-diisocyanate and hexamethylene diisocyanate.

When all or a major portion of the epoxy compound used is reacted with the polyurethane starting materials, the best all around properties including hot oil age resistance are obtained when the equivalent weight ratio of polyisocyanate to polyol (preferably a dihydroxy terminated polyester) is about 1.1/1 to 1.2/1; the preferred range is about 1/1 to 1.5/1 although a range as low as .95/1 to as high as about 2/1 may be used to provide some benefits of the present invention. It is possible that the epoxy compound is actually built into the polyurethane chain, but I do not wish to be held to that theory.

While the epoxy compounds should for best results be present during formation of the polyurethane, improved results may also be obtained when all or a major portion of the epoxy compound is added to the polyurethane gum on the mill. I have found that the above equivalent ratios of polyisocyanate to polyol hold for the case where the epoxy compound is not originally built into the polyurethane chain. This is in contrast to generally preferred polyisocyanate/polyol ratios of about .95/1 to 1.1/1 and optimum ranges of .98/1 to 1.06/1 in the case of a polyurethane made only from a polyol and polyisocyanate and not made with epoxy compounds. As previously pointed out, such conventional polyurethanes soften and depolymerize when aged in the absence of oxygen.

While flexible polyurethanes are preferred, rigid polyurethanes are useful for some applications. Rigid polyurethanes may be produced by increasing the amount of crosslinking between the linear chains of the polymer, for instance, by using a crosslinking agent such as trimethylol propane or by using polyesters or polyethers of the crosslinking type. When trifunctional polyols or triisocyanates are used, the amount of polyisocyanate used is about one equivalent weight per equivalent weight of polyol.

The polyurethanes used in the present invention are preferably polyester diisocyanate reaction products for the best abrasion resistance and high flex life properties although benefits are obtainable with polyether diisocyanate polyurethanes. Polyesters suitable for use in the present invention may be formed by reacting a glycol or bifunctional polyol of the general formula

$$HO-(RO)_n-H$$

where $n$ is an integer of 1 to 50 and R is a hydrocarbon group preferably a divalent aliphatic hydrocarbon or alkylene group (including methylene, ethylene, propylene, butylene, isopropylene and isobutylene, etc.) with a saturated polycarboxylic acid. Generally saturated dibasic acids are used such as adipic, glutaric, sebacic, phthalic and terephthalic acids. Suitable glycols are ethylene glycol, di-ethylene glycol, propylene glycol, polyethylene glycol and polypropylene glycol or mixtures of one or more of these. The polyesters are preferably formed by reacting a slight excess of glycol over a 1 to 1 molar ratio with a suitable dibasic acid. The mixture is heated and the reaction is stopped when the desired viscosity is obtained. The reaction proceeds with loss of water which is continually removed.

The preferred polyethers for polyurethane elastomers are polypropylene glycols, mixed poly(ethylene-propylene) ether glycols, and polytetramethylene ether glycol.

Desirable properties for the polyethers are very low acid number or no acid number and hydroxyl groups on the ends of the molecular chain.

Examples of suitable polyethers are from the class of polyalkylene ether glycols, such as polyethylene glycol, polypropylene glycols, polytetramethylene ether glycol, polytrimethylene ether glycol, polyneopentylene ether glycol, polypentamethylene ether glycol. These polyalkylene ether glycols, having a molecular weight of about 600 or more form superior polyurethanes. They preferably have an even higher molecular weight such as one of about 2000 to 4000 or so. The mixed polyalkylene ether glycols such as poly(ethylene-propylene) ether glycols of the above molecular weight ranges are less susceptible to crystallization than are the polyethylene glycols and form with the diisocyanate polyurethane rubbers having superior properties at low or even moderate temperatures.

The quantities of diisocyanates and polyether-glycol mixture when used in accordance with this invention should be close to a 1.1/1 to 1.2/1 equivalent weight ratio and preferably about .95 to 1.1 equivalent weights of polyisocyanate per one equivalent weight of polyether (or polyesters as hereinbefore described) for best results. When used in this ratio, the resulting polyurethanes have good stability and may be milled and stored indefinitely. Evidence of slight cure or set up can sometimes be observed at very slight excess polyisocyanate over a 1.5/1 equivalent weight ratio of polyisocyanate to the polyether so that the 1.1/1 to 1.2/1 molar ratio is the most desirable.

A large initial excess of isocyanate enhances the improvement on polyurethane stability in hot oil.

While the polyurethanes may be cured by the use of excess polyisocyanate over that required to react with the hydroxyl end groups of the polyol as is well known in the art, or by the use of suitable methylol compounds such as dimethylol urea, the polyurethanes are preferably cured by dialkyl or other organic peroxide curing agents such as dicumyl peroxide and di-tertiary butyl peroxide as disclosed in the aforementioned application, Serial No. 535,280 of Gruber and Keplinger. When free isocyanate is used as the curing agent about ½ to 8 parts by weight based on the weight of the polyurethane of an organic diisocyanate or preferably a triisocyanate is generally used.

The organic peroxides apparently withdraw hydrogen atoms from activated methylene groups of the polyurethanes to form free radicals in their respective chains which can crosslink the molecular chains together. The peroxide curing agents are disclosed in the aforementioned copending application Serial No. 535,280 and are of the general formula R'—O—O—R where R and R' are substituted and unsubstituted organic groups including alkyl, aralkyl and such groups containing one or more nonfunctional groups and/or alkyl groups and substitutes. The R and R' groups preferably contain an aliphatic group of at least 2 carbon atoms attached directly to a peroxide oxygen atom. While the best results are obtained with dicumyl peroxide, other peroxide type curing agents are ditertiary butyl peroxide, di-2,2-bis (t-butyl) peroxy butane, chlorine substituted dialkyl peroxides such as 2,2-bis(dichlorophenyl) isopropyl peroxide. Also effective in carbon black-polyurethane elastomers are methyl cumyl peroxide, cymyl cumyl peroxide, t-butyl cumyl peroxide and 1-isobutoxy-1-cumyl peroxy ethane.

For non-black stocks, suitable peroxides are t-butyl perbenzoate, lauroyl peroxide, or benzoyl peroxide. The peroxides are preferably used in amounts of 0.5 to 8 percent by weight of the polyurethane.

When an organic peroxide is used for the main curing agent, the total amount of diisocyanate used per mole of total polyol used may be less than when no peroxide is used and is preferably the range of 1.1 to 1.2 moles. Generally the range of total diisocyanate used should be at least 0.95 mole and no more than 2 moles.

In making the polyurethanes, the diisocyanate and polyether or polyester are mixed together and allowed to polymerize at any suitable temperature, preferably at a temperature of about 115° C. or 100° to 140° C. The time for this reaction may be as short as 15 minutes although 4 to 8 hours is preferred. Polymerization at room temperature requires a much longer time.

A polymerization catalyst may as is customary be used in forming the polyurethane. Examples of such are iron acetonyl acetonate, octyleneglycol titanate, stearyl titanate, ferrocene (di-cyclopentadienyl iron) and tertiary amines, such as alpha methyl benzyl-dimethyl amine.

After polymerization, the urethane polymers are further processed preferably by mastication on a Banbury mixer. Diepoxide compounds and other compounding ingredients are mixed into the polyurethane elastomer at this time especially if not previously added when the urethane is made. After compounding and milling, the elastomers are generally cured for about 10 to 120 minutes at approximately 35 to 60 pounds per square inch steam pressure (280–307° F.). The polyester urethanes thus may be compounded with carbon black, stored and processed with about the same ease as one would experience in processing ordinary rubber compositions.

Apparently, the peroxide curing agents decompose at curing temperature so that no more crosslinking is possible from residual amounts of curing agent during subsequent exposure to the degrading action of hot oils or other media where oxygen is absent. Perhaps the diepoxide compounds, being more stable at higher temperatures, function as a continuing vulcanizing agent to keep the polymer chain crosslinked and held together in spite of the continuous breaking of the chains when aged in hot oil.

When an organic peroxide is used for the main curing agent, the total amount of diisocyanate used per mole of polyester or polyether used may be less than when no peroxide is used and is preferably in the range of 0.97 to 1.04 moles. Generally the range of total diisocyanate used should be at least 0.95 mole and no more than 1.1 moles.

The following examples illustrate the present invention:

EXAMPLE 1

A polyurethane elastomer was prepared by reacting equal moles of p,p'-diisocyanato diphenyl methane and poly 60/40 (ethylene-butylene-1,4) adipate having a molecular weight of 2000. The reaction mixture was allowed to stand in a closed container for 6 hours at a temperature of 115° C. to form a polyester-urethane gum.

EXAMPLE 2

A series of polyurethane compositions were prepared by compounding the polymer formed in Example I with various compounding ingredients including an organic diepoxide according to the formulations shown in Table I.

*Table I*

| Ingredient | Parts by Weight | | | | | |
|---|---|---|---|---|---|---|
| | (Control) A | B | C | D | E | F |
| Polyurethane: Polymer of Example 1 | 100 | 100 | 100 | 100 | 100 | 100 |
| Stearic acid | 0.2 | 0.2 | 0.2 | 0.2 | 0.2 | 0.2 |
| Carbon black (FEF, Fine Extrusion Furnace) | 25 | 25 | 25 | 25 | 25 | 25 |
| Curing agent: dicumyl peroxide | 1.6 | 1.6 | 1.6 | 1.6 | 1.6 | 2.0 |
| Diglycidyl ether of Bisphenol A | None | 2.5 | 4.0 | 8.0 | 12.0 | 12.0 |

The resultant polyurethane rubber compositions were sheeted out and formed into test specimens in molds using a curing time of 45 minutes and 50 lbs. steam pressure. Tests were conducted on the above test specimens to evaluate their resistance to degradation under high temperature conditions by aging them in a hot ASTM #1 oil bath and a drying over with a normal air atmosphere.

Test results are shown in Table II:

Table II

| Stock | Conditions, Hrs. and Temp. | Oil (ASTM #1) | | | | Air | | | |
|---|---|---|---|---|---|---|---|---|---|
| | | T.S. | E, Percent | 300M | S.H. | T.S. | E, Percent | 300M | S.H. |
| B | 24@300° F | 3,360 | 690 | 1,010 | 56 | Not Tested | | | |
| C | | 3,200 | 735 | 1,000 | 56 | | | | |
| D | | 3,350 | 775 | 825 | 55 | | | | |
| E | | Not Tested | | | | | | | |
| F | | Not Tested | | | | | | | |
| A (control) | 48@300° F | 1,530 | | 200 | | Not Tested | | | |
| B | | 3,060 | 675 | 940 | 55 | | | | |
| C | | 2,875 | 680 | 825 | 54 | | | | |
| D | | 2,910 | 755 | 750 | 54 | | | | |
| E | | Not Tested | | | | | | | |
| F | | Not Tested | | | | | | | |
| A | 72@300° F | 1,020 | | 170 | | Not Tested | | | |
| B | | 285 | 800 | 70 | 31 | | | | |
| C | | 1,850 | 640 | 450 | 51 | 2,350 | 780 | 650 | 50 |
| D | | 1,850 | 670 | 460 | 46 | 1,725 | 700 | 440 | 47 |
| E | | 1,400 | 790 | 225 | 48 | 1,650 | 860 | 150 | 39 |
| F | | 1,740 | 725 | 360 | 46 | 1,425 | 785 | 200 | 43 |
| A | 108@300° F | | | 120 | | Not Tested | | | |
| B | | 1,630 | 730 | 400 | 45 | | | | |
| C | | 2,090 | 605 | 675 | 51 | | | | |
| D | | 2,010 | 775 | 390 | 46 | | | | |
| E | | | | | | | | | |
| F | | | | | | | | | |
| A | 144@300° F | 600 | | 50 | | Not Tested | | | |
| B | | Destroyed | | | | | | | |
| C | | 1,400 | 780 | 250 | 37 | | | | |
| D | | 510 | 680 | 90 | 36 | | | | |
| C | 24@350° F | 1,110 | 585 | 350 | 40 | 1,600 | 690 | 500 | 45 |
| B | Properties before aging tests. | 4,200 | 515 | 1,940 | 65 | Not Tested | | | |
| C | | 4,150 | 580 | 1,450 | 61 | | | | |
| D | | 4,175 | 615 | 1,384 | 60 | | | | |
| E | | 3,800 | 630 | 1,035 | 51 | | | | |
| F | | 3,950 | 570 | 1,450 | 59 | | | | |
| A | | 3,700 | | 1,500 | | | | | |

In the above table: T.S. is tensile strength in p.s.i. E is elongation in percent. 300M is the modulus at 300% elongation in p.s.i. S.H. is Shore "A" hardness.

The results in Table II indicate that the age resistance of polyurethane elastomers to hot oil is substantially increased by the use of organic diepoxide compound additives.

EXAMPLE 3

Another series of tests was conducted on polymers of Example 1 which were compounded as described in Example 2 except that other additives were also used such as durene diisocyanate in the final compounding of the gum.

The results of aging tests in ASTM #1 oil conducted at 300° F. for various lengths of exposure time are recorded in Table III.

Table III

| Compound | Composition | Time to Reach 400 p.s.i. modulus at 300° F. (hours) | Corresponding tensile strength (p.s.i.) |
|---|---|---|---|
| 62G | Unmodified Polyurethane of Ex. 1 | 17 | 2,000 |
| 78H | Polyurethane of Ex. 1, 4 pts. ERL 2774. | 132 | 1,600 |
| 78I | Polyurethane of Ex. 1, 8 pts. ERL 2774. | 105 | 2,010 |
| 78J | Polyurethane of Ex. 1, 2.5 pts. ERL 2774. | 108 | 1,630 |
| 64K | Polyurethane of Ex. 1, 1 pt. Durene—Cold milled. | 82 | 1,300 |
| 64L | Polyurethane of Ex. 1, 1 pt. Durene—Hot milled. | 82 | 1,300 |
| 64M | Polyurethane of Ex. 1, 3 pts. Durene—Cold milled. | 126 | 650 |
| 64N | Polyurethane of Ex. 1, 3 pts. Durene—Hot milled. | 126 | 650 |
| 96O | Polyurethane of Ex. 1, 1.5 pts. ERL 2774, Paraffin wax. | 84 | 1,600 |
| 96P | Polyurethane of Ex. 1, 2.0 pts. ERL 2774, Durene. | 130 | 800 |
| 96Q | Polyurethane of Ex. 1, 1.5 pts. ERL 2774, Stearic Acid. | 84 | 1,350 |

In the above table, ERL 2774 is the diglycidyl ether of bisphenol A, at least 80% of which is monomeric and not polymeric in form. Also Durene is durene diisocyanate (2,3,5,6-tetramethyl para phenylene diisocyanate).

As seen in the above table, about the best balance of properties, namely modulus and tensile strength was obtained by using 4 parts of the diepoxide compound. It is also noted that the addition of a 2,3,5,6-tetra alkyl (methyl or ethyl) substituted para phenylene diisocyanate such as durene diisocyanate assists in modulus retention. However, the durene diisocyanate, even when used in combination with some of the organic diepoxide compounds, substantially reduces the ultimate tensile strength of the compounded elastomer.

EXAMPLE 4

A series of polyurethane compositions were prepared by compounding the polymer formed in Example 1 with various amounts of epoxide according to the recipe shown in Table IV:

Table IV

| Recipe | R | S | T | U |
|---|---|---|---|---|
| Polyurethane elastomer | 100 | 100 | 100 | 100 |
| Stearic Acid | 0.2 | 0.2 | 0.2 | 0.2 |
| ERL 2774 (as above) | 0 | 2 | 4 | 8 |
| Philblack A (H,M,F. black) | 25 | 25 | 25 | 25 |
| Dicup 40-C (dicumyl peroxide) | 4.5 | 4.5 | 4.5 | 4.5 |

In the above table, Dicup 40-C is 40% active dicumyl peroxide and Philblack A is carbon black.

The compositions were cured for 20 minutes at 320° F. The compositions were evaluated in a manner similar to that described in Example 2, the results of which are shown below:

Table V

| Original Properties | R | S | T | U |
|---|---|---|---|---|
| Compression Set "B" @ 158° F., percent | 13.5 | 10.5 | 20 | 14 |
| Goodrich flexometer—Static compression, percent | 11.7 | 11.7 | 13.0 | 15.4 |
| T, ° F | 66 | 59 | 52 | 48 |
| Set, percent | 6.1 | 4.3 | 5.5 | 5.3 |
| Demattia flexes to 1/2" crack | 12,000 | 10,000 | 20,000 | 40,000 |
| Goodyear Healey Rebound, percent | 70.7 | 68.4 | 66.2 | 65.7 |
| Stress$_{11}$, lb./in.$^2$ | 2,025 | 2,150 | 1,900 | 1,650 |
| Tensile, lb./in.$^2$ | 4,125 | 4,200 | 3,900 | 3,700 |
| Elongation, percent | 500 | 500 | 510 | 560 |
| Shore "A" (hardness) | 65 | 64 | 62 | 59 |

Table V—Continued

AGED 200 HOURS IN ASTM #1 OIL

| Recipe | R | S | T | U |
|---|---|---|---|---|
| Stress$_{41}$, lb./in.$^2$ | destroyed | 50 | 75 | 275 |
| Tensile, lb./in.$^2$ | | 50 | 275 | 825 |
| Elongation, percent | | 1,400+ | 800 | 600 |
| Shore "A" (hardness) | | 10 | 25 | 30 |

As seen in the above table, vulcanizate U, containing the most epoxide compound, retained the greatest proportion of its original properties. Stress$_{41}$ means modulus at 300% elongation.

EXAMPLE 5

A series of polyurethane compositions were made. A diepoxide compound was incorporated in a polyurethane (and possibly built into the polyurethane chain) by adding various amounts of the epoxide compound to a 60/40 poly(ethylene-butylene) polyester before reaction with the polyisocyanate (p,p'-diisocyanato diphenyl methane). In addition, the epoxide compound was milled into the polyester/polyisocyanate reaction product before addition of the other compounding ingredients. The following recipe was used:

| | A' | B' | C' | D' | E' |
|---|---|---|---|---|---|
| Polyurethane: | | | | | |
| Polyesterurethane of Example I (no epoxide) | 100 | | | | |
| Polyesterurethane of Example I includes 10 parts ERL-2774 added on ball mill | | 100 | | | |
| 2 parts ERL-2774 added to 100 parts 60/40 (polyethylene) adipate (MW=2,000) and reacted with 11.7 parts of MDI (p,p'-diisocyanato diphenyl methane) | | | 100 | | |
| 5 parts of ERL-2774 added to 100 parts 60/40 (polyethylene) adipate (MW=2,000) and reacted with 11.7 parts of MDI (p,p'-diisocyanato diphenyl methane) | | | | 100 | |
| 10 parts (ERL-2774 added to 100 parts 60/40 (polyethylene) adipate (MW=2,000) and reacted with 11.7 parts of MDI (p,p'-diisocyanato diphenyl methane) | | | | | 100 |
| Compounding Ingredients: | | | | | |
| Stearic Acid | 0.2 | 0.2 | 0.2 | 0.2 | 0.2 |
| Philback A (carbon black) | 25 | 25 | 25 | 25 | 25 |
| Dicumyl peroxide | 1.8 | 1.8 | 1.8 | 1.8 | 1.8 |

The compositions were cured for 20 minutes at 320° F. The vulcanizates were tested, the results of which are found in Table VI:

EXAMPLE 6

Excellent thermal stability was also obtained by curing polyurethanes with both polyisocyanates and an epoxide compound. As illustration of this aspect to the present invention, a polyurethane composition was prepared according to the following recipe.

| Ingredient: | Parts by weight |
|---|---|
| 60/40 poly(ethylene-butylene-1,4) adipate/MDI polyurethane | 100 |
| Stearic acid (lubricant and milling) | 0.1 |
| FEF (carbon black) | 25 |
| ERL-2774 | 10 |
| Polymethylene polyphenyl isocyanate (PAPI, see Ex. 7) | 5 |

The resultant composition was cured for 20 minutes at 320° F. and tested, the results of which are recorded in Table VII.

Table VII

| Original properties: | |
|---|---|
| Stress$_{41}$, lb./in.$^2$ | 1025 |
| Tensile, lb./in.$^2$ | 2530 |
| Elongation, percent | 630 |
| Shore "A" | 59 |
| Aged 100 hours at 300° F. in ASTM #1: | |
| Stress$_{41}$, lb./in.$^2$ | 1150 |
| Tensile, lb./in.$^2$ | 1150 |
| Elongation, percent | 300 |
| Shore "A" | 46 |

It can be seen that the properties of the cured polyurethane composition were still of a high order even after aging for 100 hours at 300° F. in ASTM #1 oil.

EXAMPLE 7

A series of polyurethane compositions were mixed and milled together according to the formulations shown in Table VIII:

Table VIII

| Recipes | F' | G' | H' | I' | J' | K' |
|---|---|---|---|---|---|---|
| Polyurethane gum | 340 | 340 | 340 | 340 | 400 | 100 |
| Stearic acid | 0.8 | 0.8 | 0.8 | 0.8 | 0.8 | 0.8 |
| Epon 828 | 60 | 60 | 60 | 60 | | |
| Nadick anhydride | | 20 | 40 | 60 | 20 | |
| FEF black | 100 | 100 | 100 | 100 | 100 | 100 |
| PAPI | 20 | 20 | 20 | 20 | 20 | 20 |

In the above Table VIII, Nadick anhydride is endo-cis-bicyclo[2,2,1] - 5 - heptene-2,3 dicarboxylic anhydride.

Table VI

| | A' | B' | C' | D' | E' |
|---|---|---|---|---|---|
| | Control (No diepoxide) | ERL-2774 added on Mill | 2 parts in Polyester | 5 parts in Polyester | 10 parts in Polyester |
| Original: | | | | | |
| Stress at 300% | 2,425 | 2,325 | 2,350 | 1,875 | 1,325 |
| Tensile | 4,325 | 4,550 | 4,825 | 3,725 | 3,225 |
| Elongation | 470 | 490 | 520 | 500 | 600 |
| Permanent Set | 3 | 3 | 0 | 0 | 0 |
| Shore "A" | 69 | 69 | 67 | 65 | 65 |
| Aged 100 Hours in ASTM #1: | | | | | |
| Stress at 300% Elong | 25 | 50 | 275 | 750 | 575 |
| Tensile | 25 | 125 | 1,075 | 1,700 | 1,550 |
| Elongation | 1,400+ | 750 | 730 | 580 | 680 |
| Permanent Set | | 6 | 12 | 3 | 9 |
| Shore "A" | 23 | 20 | 42 | 51 | 50 |
| Aged 200 Hours in ASTM #1: | | | | | |
| Stress at 300% Elong | Destroyed | Destroyed | 25 | 150 | 550 |
| Tensile | | | 75 | 350 | 1,200 |
| Elongation | | | 700 | 370 | 580 |
| Permanent Set | | | 153 | 9 | 9 |
| Shore "A" | | | 12 | 27 | 43 |

PAPI is poly aryl polyisocyanate which is a dark somewhat viscous liquid aromatic polyisocyanate containing both ortho and para substitution according to the formula:

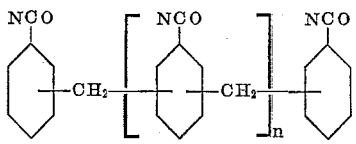

where $n$ has an average value of 1. The molecular weight is about 384 and the average number of isocyanate groups per molecule is 3.03.

Also in the above table, the polyurethane gum is a poly 60/40 (ethylene-butylene) adipate/MDI polyurethane. The polyester had a molecular of about 2000 before reaction with the diisocyanate. About 0.98 mole diisocyanate was used per 1.0 mole polyester to form the polyurethane gum. The Epon 828 is as previously defined.

The compositions were cured for 20 minutes at 320° F. The compositions were tested, the results of which are shown in Table IX:

*Table IX*

|  | F' | G' | H' | I' | J' | K' |
|---|---|---|---|---|---|---|
| Original Properties: |  |  |  |  |  |  |
| Stress$_{41}$, lb./in.$^2$ | 1,500 | 850 | 625 | 630 | 2,175 | 2,000 |
| Tensile, lb./in.$^2$ | 2,400 | 2,200 | 1,725 | 1,700 | 3,650 | 3,700 |
| Elongation, percent | 460 | 690 | 670 | 650 | 540 | 510 |
| Shore "A" | 62 | 55 | 53 | 50 | 69 | 69 |
| Aged 100 hours at 300° F. in ASTM #1: |  |  |  |  |  |  |
| Stress$_{41}$, lb./in.$^2$ | 850 |  | 400 |  | 50 | 75 |
| Tensile, lb./in.$^2$ | 850 | 575 | 400 | 500 | 50 | 100 |
| Elongation, percent | 300 | 270 | 140 | 100 | 500 | 450 |
| Shore "A" | 59 | 45 | 42 | 51 | 15 | 29 |

Again it is noted that outstanding results are obtained by combination of an epoxide and a polyisocyanate curing agent, both with and without the use of an acid anhydride.

In the above examples, the polyester used in the polyester-urethane elastomer may be substituted in whole or part by polyalkylene ether glycols such as poly(ethylene-propylene) ether glycol and polytetramethylene ether glycol as previously discussed.

The following example illustrates a polyether-urethane elastomer with improved hot oil resistance made according to the present invention:

EXAMPLE 8

A polyether-urethane elastomer was prepared using equal moles of p,p'-diisocyanato diphenyl methane and polytetramethylene ether glycol having a molecular weight of 3000. The above ingredients were mixed and allowed to stand at 115° C. for 16 hours to form a rubbery polyurethane having a Mooney viscosity (ML–4 at 212° F.) of about 40.

The polyurethane was compounded with 30 parts carbon black, 0.2 part stearic acid, 3 parts dicumyl peroxide and 4 parts of the diglycidyl ether of bisphenol C.

The compounded rubber was milled, sheeted out and cured for 45 minutes at 287° F. The resultant rubber exhibited improved hot oil resistance over a rubber compounded as above but without the diglycidyl ether of bisphenol C.

The reaction times required for reaction of the diepoxide with the isocyanate or hydroxyl end groups of the polyester may be greatly shortened by use of higher reaction temperature and/or by employing a suitable catalyst such as a tertiary amine particularly one having an aralkyl group and alkyl groups attached to nitrogen. An example of such preferred tertiary amine is alphamethylbenzyl-, dimethyl amine. The diepoxide may also be preheated with either the diisocyanate or the polyester at elevated temperatures preferably of 90 or 100° C. to 150° C. to shorten the reaction time. The results obtained are substantially the same when the product is produced in a shortened time or when a slower reaction is had. Any elevation in temperature accelerates the reaction.

It is well understood that, in accordance with the provisions of the patent statutes, variations and modifications of the specific rubber compositions and methods disclosed herein may be made without departing from the spirit of the invention.

What I claim is:

1. In a process of forming a polyurethane rubber wherein a polyurethane polymer in the form of a gum stock is mixed with carbon black and an organic peroxide curing agent and thereafter cured at elevated temperature to form a solid elastomer, the improvement which comprises providing in admixture with said polymer prior to curing of the rubber composition about 5 to 15 parts per 100 parts by weight of said polymer of an organic epoxy compound having a molecular chain of 3 to 45 carbon atoms and at least one terminal epoxide group and having no groups reactive with said polymer other than epoxide groups.

2. In a process of forming a polyurethane rubber wherein a polyurethane polymer in the form of a gum stock is mixed with carbon black and an organic peroxide curing agent and thereafter cured at elevated temperature to form a solid elastomer, the improvement which comprises forming gum stock by reaction of about 0.95 to 2 equivalent weights of an organic diisocyanate with one equivalent weight of a linear polyester having only two terminal alcoholic hydroxyl groups and a molecular weight of about 1000 to 4000 and, prior to curing of the rubber composition, incorporating about 0.25 to 20 parts per 100 parts by weight of said polymer of an organic epoxy compound having a molecular chain of 3 to 45 carbon atoms and 2 terminal epoxide groups.

3. A process as defined in claim 1 wherein said epoxy compound is a diglycidyl ether of a dihydric phenol, said polyurethane gum stock is the reaction product of about 0.95 to 2 equivalent weights of an organic diisocyanate and one equivalent weight of a linear polyester dialcohol which is the reaction product of a saturated aliphatic dicarboxylic acid and a glycol and has a molecular weight of about 1000 to 4000, and said diglycidyl ether is mixed with the polyurethane polymer after formation of said gum.

4. A process as defined in claim 2 wherein said epoxy compound is a diglycidyl ether of a dihydric alcohol and is incorporated prior to formation of the polyurethane polymer, said diisocyanate and said polyester being reacted in the presence of said diglycidyl ether to form said gum.

5. A process as defined in claim 2 wherein about 1 to 1.5 equivalent weights of said diisocyanate are reacted with one equivalent weight of said polyester to form said gum stock, thereafter 100 parts of the polyurethane polymer are mixed with about ½ to 8 parts by weight of an organic polyisocyanate having 2 to 3 isocyanato groups, and the resulting rubber composition is cured at elevated temperature.

6. A process as defined in claim 5 wherein said polyisocyanate has 3 isocyanato groups.

7. A product as defined in claim 11 wherein said diisocyanate is p,p'-diisocyanato diphenyl methane, said hydroxyl-terminated polyester has a molecular weight of about 2000 and is reacted with said diisocyanate at a temperature of about 115° C. for about 6 hours to form said rubber, and wherein 100 parts by weight of said rubber are mixed with about 25 parts of furnace carbon black, about 0.2 part of stearic acid, about 1.6 parts of dicumyl peroxide, and about 8 parts of

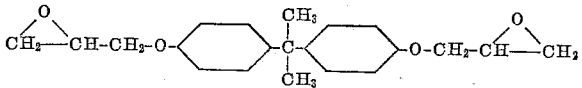

being distributed throughout the rubbery polyurethane after said polyurethane has been formed to the plastic rubbery state.

8. An elastomeric polymeric product produced by mixing and reacting about 0.95 to 2 equivalent weights of an organic diisocyanate with one equivalent weight of a linear polyol having a molecular weight of at least 500 and selected from the group consisting of polyalkyleneether glycols and polyester glycols prepared from glycols and dicarboxylic acids to produce a polyurethane polymer, mixing said polymer with a reinforcing filler and a curing agent, and curing the resulting rubber composition to the elastic state, characterized in that
(1) said polymeric product contains an organic epoxy compound having 3 to 45 carbon atoms and at least one terminal epoxy group and no other groups for reaction with said polyol and said diisocyanate, and
(2) that about 5 to 20 parts by weight of said epoxy compound are incorporated with 100 parts of said polyurethane polymer prior to said curing.

9. A solid elastomer as defined in claim 8 wherein said polyol is a polyester alcohol having a molecular weight of about 1000 to 4000, said organic epoxy compound and a reinforcing carbon black are distributed throughout the rubbery polyurethane after forming of said gum stock, and said organic epoxy compound is a glycidyl polyether of a polyhydric organic compound selected from the group consisting of polyhydric alcohols and polyhydric phenols.

10. A polyurethane composition curable to a rubber which is characterized by having improved resistance to heat when heated in the absence of air and when immersed in oil, said composition comprising (1) a rubbery reaction product of 0.95 to 2 equivalent weights of an organic diisocyanate with one equivalent weight of a linear polyol having a molecular weight of at least 500 and selected from the group consisting of polyalkyleneether glycols and polyester glycols and (2) 0.25 to 20 parts by weight per 100 parts of said reaction product of an organic epoxy compound having 3 to 45 carbon atoms, at least one epoxy group and no other group reactive with said polyol and said diisocyanate.

11. A polyurethane composition curable to a rubber which is characterized by having improved resistance to heat when heated in the absence of air and when immersed in oil, said composition comprising (1) a rubbery reaction product of from about 1 to 1.5 equivalent weights of an organic diisocyanate with one equivalent weight of a linear polyester glycol having a molecular weight of from 1000 to 4000 and formed by reacting a dicarboxylic acid with a glycol of the general formula HO—(RO)$_n$—H in which each R is a divalent hydrocarbon radical and $n$ is an integer of 1 to 50 and (2) about 5 to 15 parts by weight per 100 parts of said reaction product of an organic epoxy compound having 3 to 45 carbon atoms, at least two epoxy groups and no other group reactive with said glycol and said diisocyanate.

12. The composition of claim 11 wherein said dicarboxylic acid is a saturated aliphatic dicarboxylic acid, said glycol is a polyglycol.

13. The composition of claim 12 wherein said diisocyanate consists essentially of p,p'-diisocyanato diphenyl methane.

14. The composition of claim 11 wherein said organic epoxy compound consists essentially of the diglycidyl ether of a dibasic alcohol.

15. The composition of claim 10 comprising a reinforcing carbon black distributed throughout said reaction product.

16. A polyurethane composition curable to a rubber which is characterized by having improved resistance to heat when heated in the absence of air and when immersed in oil, said composition comprising a polyurethane gum containing from 0.25 to 20 parts by weight per 100 parts of gum of an organic epoxy compound having 3 to 45 carbon atoms, at least one epoxy group and no other group reactive with said gum.

17. In the common method of making a cured rubbery polyurethane comprising a rubbery reaction product of 0.95 to 2 equivalent weights of an organic diisocyanate with one equivalent weight of a linear polyol having a molecular weight of at least 500 and selected from the group consisting of polyalkyleneether glycols and polyester glycols, the improvement consisting of distributing throughout said rubbery reaction product prior to curing from 0.25 to 20 parts by weight per 100 parts of said reaction product of an organic epoxy compound having 3 to 45 carbon atoms, at least one epoxy group and no other groups reactive with said polyol and said diisocyanate, whereby the cured rubbery polyurethane has improved resistance to heat in the absence of air and particularly improved resistance to degradation when immersed in hot oils.

References Cited in the file of this patent

UNITED STATES PATENTS

| | | |
|---|---|---|
| 2,166,604 | Meyer | July 18, 1939 |
| 2,404,781 | Arnold | July 30, 1946 |
| 2,432,148 | Furness et al. | Dec. 9, 1947 |
| 2,712,535 | Fisch | July 5, 1955 |
| 2,725,366 | Seeger et al. | Nov. 29, 1955 |
| 2,729,618 | Muller et al. | Jan. 3, 1956 |
| 2,759,901 | Greenlee | Aug. 21, 1956 |
| 2,777,831 | Seeger et al. | Jan. 15, 1957 |
| 2,859,199 | Parker | Nov. 4, 1958 |
| 2,947,717 | Belanger | Aug. 2, 1960 |
| 3,063,958 | Perkins et al. | Nov. 13, 1962 |

FOREIGN PATENTS

| | | |
|---|---|---|
| 758,433 | Great Britain | Oct. 3, 1956 |